United States Patent
Bulman et al.

(10) Patent No.: US 6,361,277 B1
(45) Date of Patent: Mar. 26, 2002

(54) METHODS AND APPARATUS FOR DIRECTING AIRFLOW TO A COMPRESSOR BORE

(75) Inventors: David E. Bulman, Cincinnati; Kenneth E. Seitzer, Mason; Craig P. Burns, Mason; Jeffrey D. Clements, Mason, all of OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/490,625

(22) Filed: Jan. 24, 2000

(51) Int. Cl.[7] .................................................. F01D 5/08
(52) U.S. Cl. ................................ 416/96 R; 416/198 A
(58) Field of Search ............................. 416/96 R, 182, 416/185, 198 A

(56) References Cited

U.S. PATENT DOCUMENTS 3,647,313 A  *  3/1972  Koff ........................... 415/115
4,844,694 A  *  7/1989  Naudet ...................... 416/198 A
5,232,339 A  *  8/1993  Plemmons et al. ......... 415/178
5,350,278 A  *  9/1994  Burge ........................ 416/198 A
5,700,130 A  * 12/1997  Barbot et al. .................. 416/95

* cited by examiner

Primary Examiner—Edward K. Look
Assistant Examiner—Ninh Nguyen
(74) Attorney, Agent, or Firm—Andrew C. Hess; Rodney M. Young

(57) ABSTRACT

A gas turbine engine includes a compressor rotor assembly which directs air at a sufficent pressure and temperature to a compressor rotor bore. The compressor assembly includes a compressor including a plurality of rotors joined with a plurality of couplings. Each of the rotors includes a radially outer rim, a radially inner hub, and a web extending therebetween. The web includes a flange including a plurality of slots which define a plurality of radial vanes that are airfoil-shaped. The vanes effectively deswirl bleed air and re-direct the airflow to a compressor bore.

19 Claims, 4 Drawing Sheets

METHODS AND APPARATUS FOR DIRECTING AIRFLOW TO A COMPRESSOR BORE

GOVERNMENT RIGHTS STATEMENT

The United States Government has rights in this invention pursuant to Contract No. N00019-C-0176 awarded by the Department of the Navy.

BACKGROUND OF THE INVENTION

This application relates generally to gas turbine engines and, more particularly, to gas turbine engine compressors.

A gas turbine engine typically includes a multi-stage axial compressor with a number of compressor blade or airfoil rows extending radially outwardly from a common annular rotor rim. An outer surface of the rotor rim typically defines a radially inner flowpath surface of the compressor as air is compressed from stage to stage. An interior area within the rotor rim is referred to as a compressor bore and typically includes a secondary flow cooling circuit. Airflow of a sufficient pressure and temperature supplied to the secondary flow cooling circuit is used to drive secondary flow cooling circuit components including sump hardware.

Compressor bleed air is often directed to the secondary flow cooling circuit. However, the temperature of the compressor bleed air limits the locations in which compressor air extraction may occur. Higher temperature bore cooling airflows may reduce strength of the compressor rotor components, while cooler temperature bore cooling airflows typically have insufficient pressure to drive such compressor bore cooling circuits. To increase the compressor bore cooling circuit pressure, bleed air may be extracted further aft in the compressor flowpath. Typical bleed air systems include complicated delivery systems. Delivery system components use complex attachment schemes with additional hardware. The additional hardware adds to the overall compressor rotor weight, and thus, affects the performance of the gas turbine engine. As a result, both assembly time and potential of failure of both the additional hardware and the compressor rotor components are increased.

BRIEF SUMMARY OF THE INVENTION

In an exemplary embodiment, a gas turbine engine includes a compressor rotor assembly which effectively directs air at a sufficient pressure and temperature to a compressor rotor bore. The compressor assembly includes a compressor including a plurality of rotors joined with a plurality of couplings. Each rotor includes a radially outer rim, a radially inner hub, and a web extending between the outer rim and the inner hub. The web includes a flange having a front face, a rear face and a plurality of openings extending from the front face to the rear face and sized to receive the couplings. The flange front face includes a plurality of slots which define a plurality of radial vanes that are airfoil-shaped.

In operation, compressor bleed air exits compressor first stage stator vanes with a free vortex swirl. The radial vanes rotate simultaneously with the compressor rotor assembly and re-direct the compressor bleed air against the free vortex direction towards the compressor bore. The rotation and shape of the airfoil cause the airflow to be deswirled as it passes through the slots. As a result, the pressure loss due to the free vortex swirl is minimized and the compressor bore receives airflow of a sufficient pressure and temperature.

DETAILED DESCRIPTION OF THE INVENTION

Figure 1:
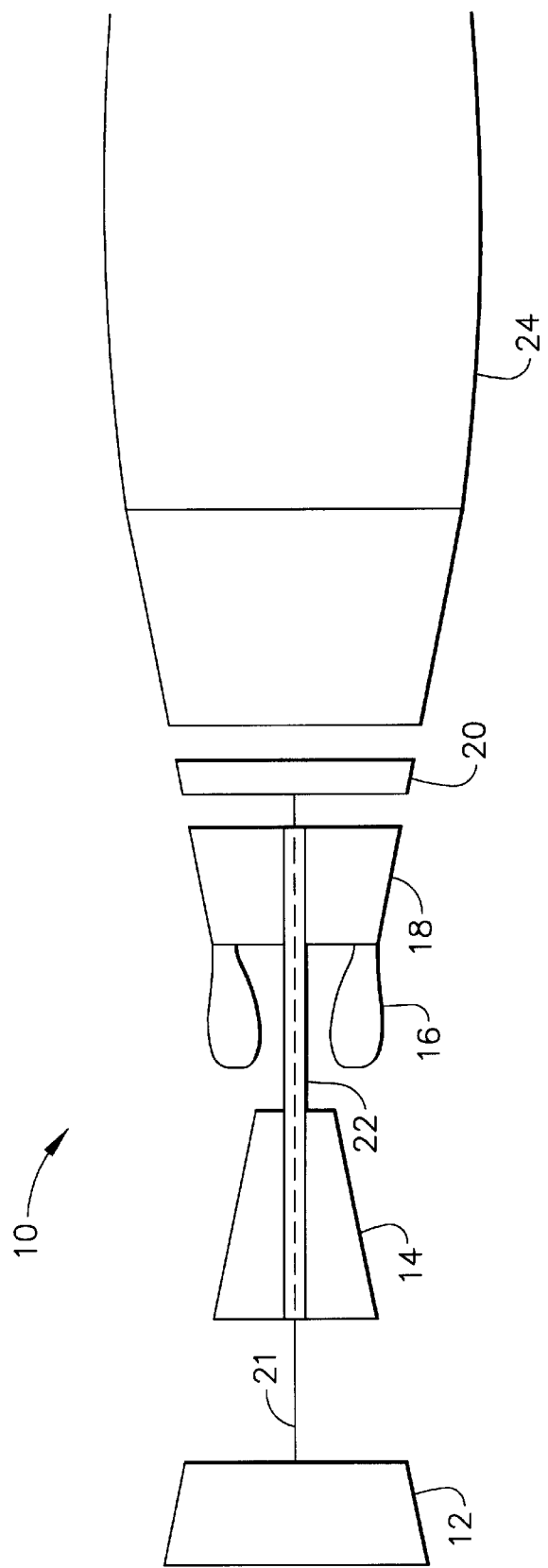
FIG. 1 is a schematic illustration of a gas turbine engine.

FIG. 1 is a schematic illustration of a gas turbine engine 10 including a low pressure compressor 12, a high pressure compressor 14, and a combustor 16. Engine 10 also includes a high pressure turbine 18 and a low pressure turbine 20. Compressor 12 and turbine 20 are coupled by a first shaft 21, and compressor 14 and turbine 18 are coupled by a second shaft 22.

In operation, air flows through low pressure compressor 12 and compressed air is supplied from low pressure compressor 12 to high pressure compressor 14. The highly compressed air is delivered to combustor 16. Airflow (not shown in FIG. 1) from combustor 16 drives turbines 18 and 20 and exits gas turbine engine 10 through a nozzle 24.

Figure 2:
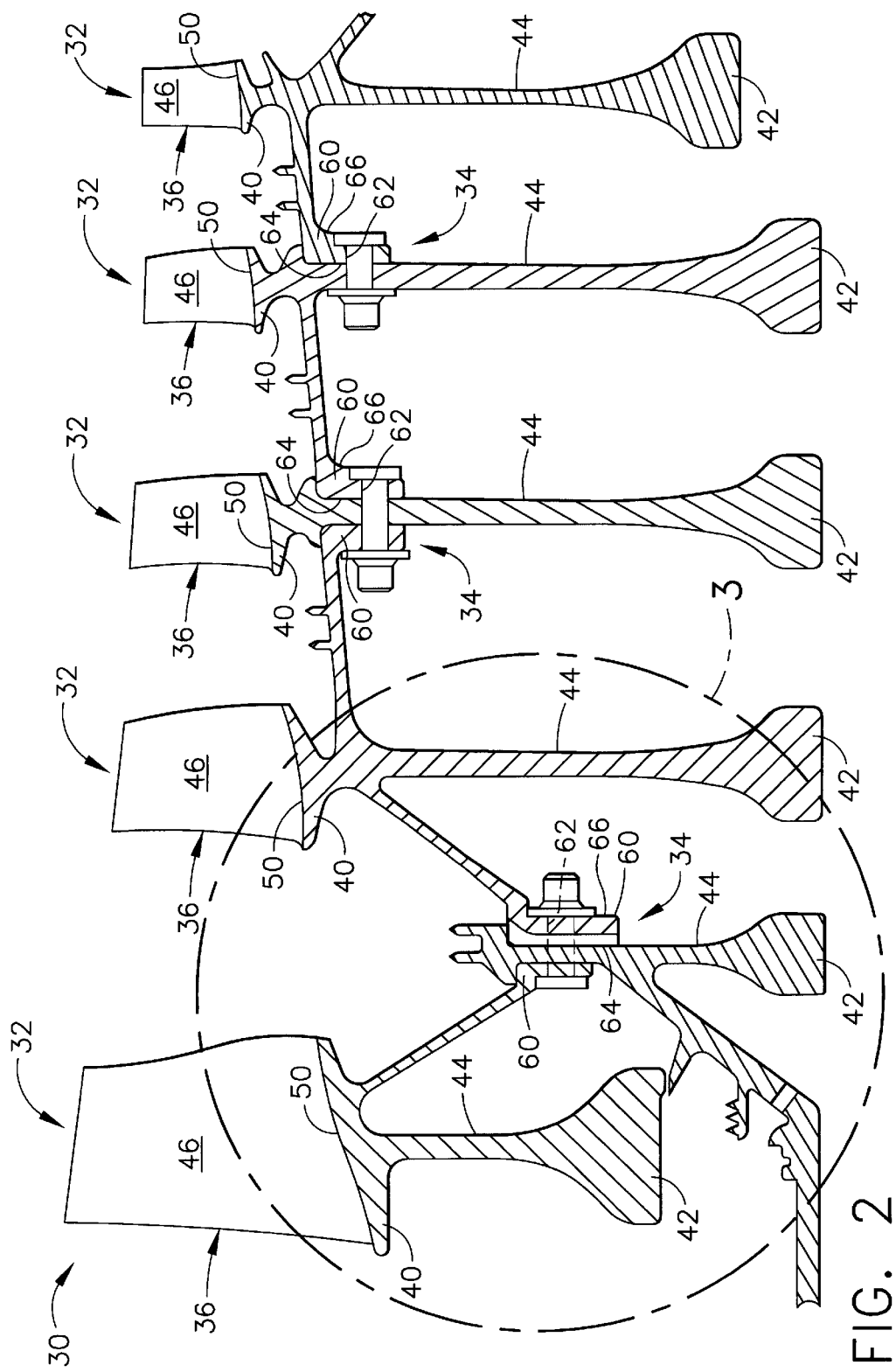
FIG. 2 is a side schematic illustration of a portion of a compressor rotor assembly used with the gas turbine engine shown in FIG. 1.

FIG. 2 is a side schematic illustration of a portion of a compressor rotor assembly 30 used with gas turbine engine 10 (shown in FIG. 1). Rotor assembly 30 includes a plurality of rotors 32 joined together with couplings 34, and rotor assembly 30 is coaxial with an axial centerline axis of gas turbine engine 10 (not shown). Each rotor 32 is formed by one or more blisks 36, and each blisk includes a radially outer rim 40, a radially inner hub 42, and an integral web 44 extending radially therebetween. An interior area within outer rim 40 sometimes is referred to as a compressor bore. Each blisk 36 also includes a plurality of blades 46 extending radially outwardly from outer rim 40. Blisks 36 extend circumferentially around compressor rotor assembly 30. Each row of blisks 36 is sometimes referred to a rotor stage.

Each blade 46 is integrally joined with a respective rim 40. Alternatively, each rotor blade 46 may be removably joined to rim 40 using blade dovetails (not shown) which mount in complementary slots (not shown) in each respective rim 40. Blades 46 cooperate with a motive or working fluid, such as air, and compress the motive fluid in succeeding rotor stages as blades 46 rotate about the axial centerline axis. As blades 46 rotate, centrifugal loads are generated and are carried by portions of rims 40 beneath each blade 46. Additionally, outer surfaces 50 of rotor rims 40 define a radially inner flow path surface of compressor rotor assembly 30 as air is compressed within compressor 14 and directed radially inward.

Each web 44 extends between each rotor radially outer rim 40 and rotor radially inner hub 42 and includes at least one flange 60 which permits rotors 32 to be coupled together with couplers 34. Each flange 60 is annular and includes a plurality of openings 62 sized to receive couplers 34. Openings 62 extend from a front face 64 of flange 60 to a back face 66 of flange 60. Each flange front face 64 is located upstream from each flange back face 66.

Figure 3:
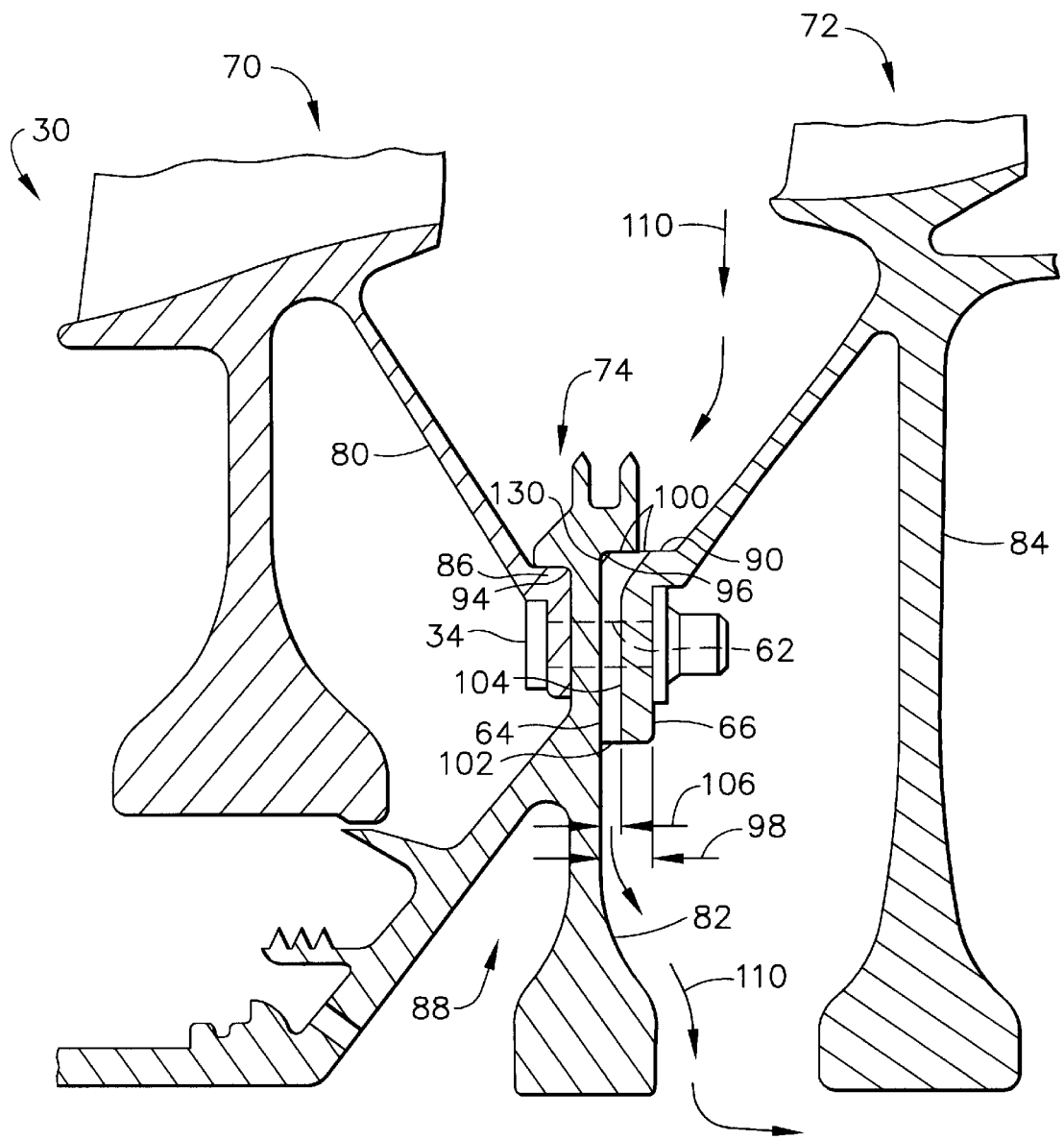
FIG. 3 is an enlarged side schematic illustration of the compressor rotor assembly shown in FIG. 2 taken along area 3.

FIG. 3 is an enlarged side schematic illustration of compressor rotor assembly 30 taken along area 3 shown in FIG. 2. A first stage rotor 70 is coupled to a second stage rotor 72 with coupler 34 at a joint 74. Joint 74 is positioned between first rotor stage and second rotor stage and permits coupler 34 to couple a first web 80, a second web 82, and a third web 84. In one embodiment, joint 74 is a rabbeted bolted joint.

Coupler 34 extends through a flange 86 of first web 80, a flange 88 of second web 82, and a flange 90 of third web 82.

Second web flange 88 includes an upstream shoulder 94 and a downstream shoulder 96. Upstream shoulder 94 is sized to receive first web flange 80 such that when joint 74 is fully assembled, second web flange 88 is positioned in contact with first web flange 80. Second web downstream shoulder 96 is sized to receive third web flange 90 such that when joint 74 is fully assembled, second web flange 88 is in contact with third web flange 90.

Third web flange 90 includes flange front face 64, flange back face 66, and openings 62 extending therebetween through a thickness 98 of flange 90. Third web flange 90 also includes a top side 100, a bottom side 102, and a slot 104 extending therebetween. In one embodiment, top side 100 is rabbeted. Slot 104 extends inward from flange front face 64 towards flange back face 66 a depth 106 less than flange thickness 98. Slot 104 provides a flowpath for compressor bleed air 110 to move radially inward from the flowpath to the compressor bore, as discussed in more detail below.

Figure 4:
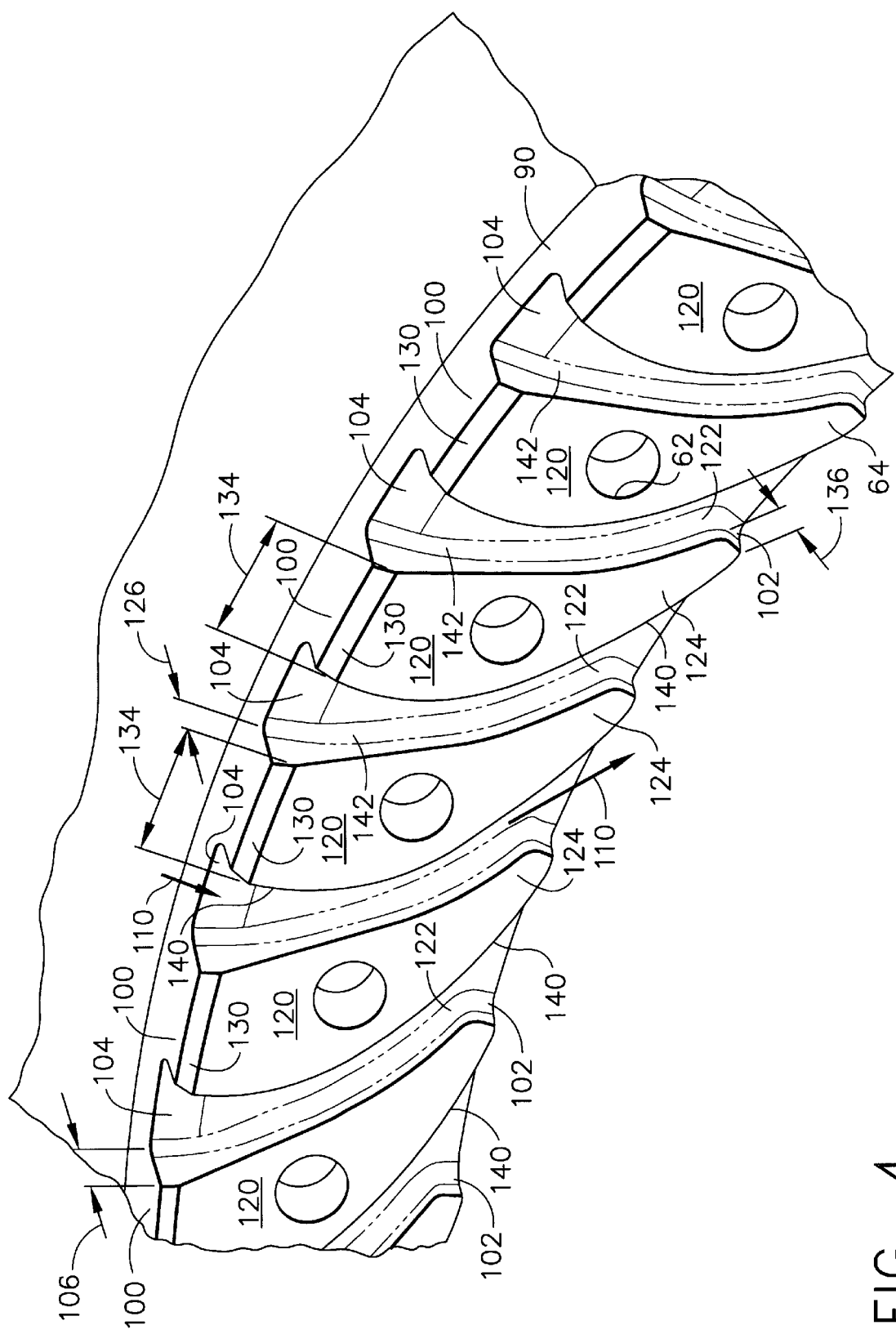
FIG. 4 is a front perspective view of a portion of the compressor rotor assembly shown in FIG. 2.

FIG. 4 is a front perspective view of third web flange 90. Third web flange front face 64 is slotted and includes a plurality of slots 104. Slots 104 extend from third web flange top side 100 to third web flange bottom side 102 and curve to define a plurality of integrated radial vanes 120. Vanes 120 include a first body portion 122 and a second body portion 124 and have a thickness 126. First body portion 122 is between second body portion 124 and flange back face 66 (shown in FIG. 3). Thickness 126 is equal to slot depth 106. First body portion 122 is tapered to provide a smooth transition between slots 104 and vanes 120. Second body portion 124 extends from first body portion 122 to flange front face 64 and includes a tapered surface 130 extending between flange top side 100 and flange front face 64.

Radial vanes 120 are airfoil-shaped such that a width 134 of vane 120 adjacent flange top side 100 is larger than a width 136 of vane 120 adjacent flange back side 102. Additionally, because of curvature of slots 104, a rotationally leading edge 140 of each vane 120 is longer than a trailing edge 142 of each vane 120. The airfoil-shape permits vane slot 104 to effectively deswirl compressor bleed air 110 and redirect it towards the compressor bore (not shown).

During operation, compressor bleed air 110 exits compressor first stage stator vanes (not shown). The compressor first stage stator vanes induce a free vortex swirl on airflow 110 passing through the first stage stator vanes. The free vortex swirl is in a clockwise direction when viewed from a downstream position facing upstream. Vanes 120 rotate simultaneously with compressor rotor assembly 30 (shown in FIGS. 2 and 3) and engage bleed air 110. Vanes 120 re-direct airflow 110 against the free vortex direction towards the compressor bore. Because airflow 110 is deswirled, pressure loss due to the free vortex swirl is minimized and airflow 110 maintains sufficient pressurization to the compressor bore.

The above-described compressor bore sump pressurization deswirler assembly is cost-effective and highly reliable. The airfoil-shaped slots effectively direct bleed air at a sufficient pressure and temperature to a compressor rotor bore. As a result, a compressor deswirler is provided which effectively directs airflow at a sufficient temperature and pressure to a compressor bore.

While the invention has been described in terms of various specific embodiments, those skilled in the art will recognize that the invention can be practiced with modification within the spirit and scope of the claims.

What is claimed is:

1. A method of fabricating a compressor rotor assembly to supply pressurized airflow to a compressor bore in a gas turbine engine, the rotor assembly including at least one rotor including a radially outer rim, a radially inner hub, and a web extending therebetween, and a plurality of circumferentially spaced apart rotor blades extending radially outwardly from the rim, the web including a deswirler assembly including a flange, said method comprising the steps of:
   integrating a plurality of slots into the flange; and
   defining radial vanes within the flange to direct airflow radially inward towards the compressor bore, such that at least one vane defines a curved flowpath.

2. A method in accordance with claim 1 wherein the flange includes a front face, a rear face, and a plurality of openings extending therebetween, said step of integrating a plurality of slots further comprising the steps of:
   extending the slots along the front face of the flange; and
   defining airfoil-shaped vanes with the slots.

3. A method in accordance with claim 2 wherein the flange is annular, said step of integrating a plurality of slots further comprising the step of extending the slots circumferentially along the front face of the flange.

4. A method in accordance with claim 3 wherein the flange further includes a top side and a bottom side, said step of integrating a plurality of slots further comprising the steps of:
   machining the slots into the front face of the flange; and
   extending the slots from the flange top side to the flange bottom side.

5. A compressor assembly for a gas turbine engine, said compressor assembly comprising a compressor comprising a plurality of rotors and a plurality of couplings, said rotors joined together with couplings, each of said rotors comprising a radially outer rim, a radially inner hub, and a web extending therebetween, said web comprising a flange comprising a front face, a rear face and a plurality of openings extending therebetween, said flange front face comprising a plurality of slots, at least one of said slots defining a curved flowpath.

6. A compressor assembly in accordance with claim 5 wherein said flange further comprises a top side and a bottom side, said slots extending from said flange top side to said flange bottom side.

7. A compressor assembly in accordance with claim 6 wherein said slots define a plurality of radial vanes disposed within said flange front face.

8. A compressor assembly in accordance with claim 7 wherein said radial vane shape directs bleed airflow towards a compressor bore cooling circuit.

9. A compressor assembly in accordance with claim 8 wherein said radial vanes are airfoil-shaped.

10. A compressor assembly in accordance with claim 8 wherein said flange is annular, said plurality of slots extending circumferentially within said compressor assembly along said flange.

11. A compressor assembly in accordance with claim 10 wherein said flange comprises a deswirler.

12. A compressor assembly in accordance with claim 11 wherein said slots are machined into said flange front face.

13. A rotor assembly for a gas turbine engine, said assembly comprising a first rotor and a second rotor, said first rotor coupled to said second rotor, at least one of said rotors comprising a radially outer rim, a radially inner hub, and a web extending therebetween, a plurality of circumferentially spaced apart rotor blades extending radially outwardly from said rim, said web comprising a slotted flange comprising at least one curved slot which redirects bleed air towards a compressor bore cooling circuit.

14. A rotor assembly in accordance with claim 13 wherein said slotted flange comprises a front face, a rear face, and a plurality of openings extending therebetween, said rotor assembly further comprising a coupler, said first rotor coupled to said second rotor with said coupler.

15. A rotor assembly in accordance with claim 14 wherein said slotted flange further comprises a plurality of slots and at least one opening, said slots disposed within said flange front face, said opening sized to receive said coupler.

16. A rotor assembly in accordance with claim 15 wherein said slots define a plurality of radial vanes configured to redirect airflow radially inward, said radial vanes disposed within said flange front face.

17. A rotor assembly in accordance with claim 16 wherein said radial vanes are airfoil-shaped.

18. A rotor assembly in accordance with claim 17 wherein said slotted flange is annular, said plurality of slots extend circumferentially along said slotted flange.

19. A rotor assembly in accordance with claim 18 wherein said flange comprises a deswirler.

* * * * *